Sept. 13, 1955     T. H. AFFLECK     2,717,612
AIR BRAKE GOVERNOR
Filed Oct. 29, 1951
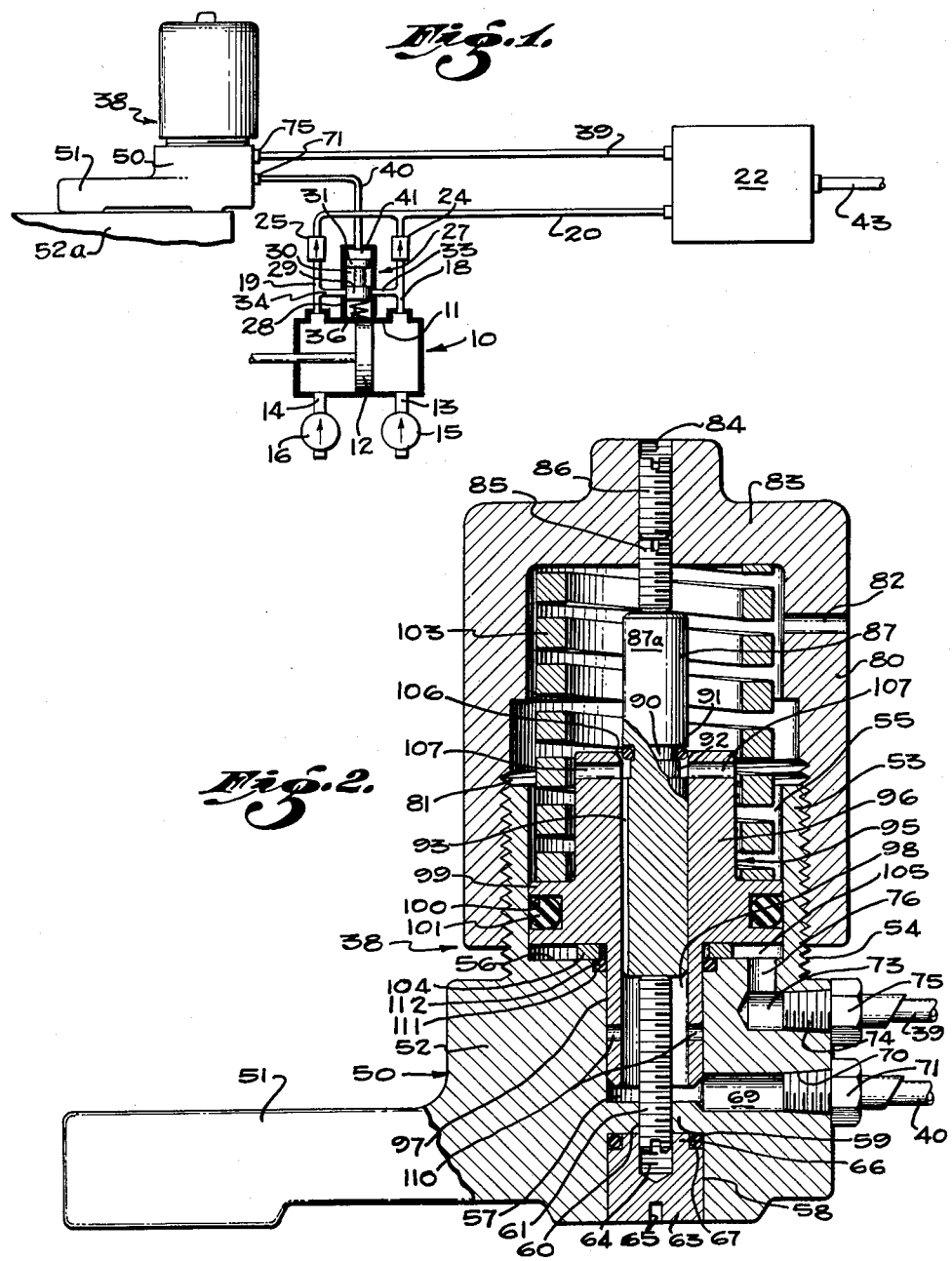
THEODORE H. AFFLECK,
INVENTOR.
BY
ATTORNEY United States Patent Office 2,717,612
Patented Sept. 13, 1955

2,717,612

AIR BRAKE GOVERNOR

Theodore H. Affleck, North Hollywood, Calif., assignor to Sweetland Corporation, a corporation of California Application October 29, 1951, Serial No. 253,739

11 Claims. (Cl. 137—102)

This invention relates to fluid pressure governors and more particularly to the type for controlling the operation of fluid compressors.

While the invention is useful in various types of installations, it has particular utility in air brake systems having continuously operated air compressors and is, therefore, shown and described as embodied in such a system. Systems of this character are used in automotive vehicles of various types although not confined thereto.

In an air brake system with a continuous operating fluid compressor for supplying fluid under pressure to a receiver such as a reservoir, where the demand of said supply is not continuous, there is a tendency for the storage reservoir to become overcharged unless means are provided for unloading the compressor when the pressure of the fluid in the reservoir attains a predetermined value.

It is, therefore, an object of the present invention to provide a governor device which is adapted to be connected to the unloading mechanism of a compressor and also to the reservoir which is supplied with fluid under pressure by the compressor, so as to automatically effect the operation of the compressor unloading mechanism in accordance with changes in the demand for fluid under pressure supplied by the compressor.

Another object of the invention is to provide the compressor system with governor means in the form of a fluid pressure controlled valve device which automatically responds to pressure of fluid in the reservoir to control the supply and release of fluid under pressure to and from the unloading mechanism.

Still another object of the invention is to provide a device of this character wherein the cut out and cut in points are adjustable.

A further object of the invention is to provide a device or mechanism of this character wherein the cut out and cut in points are adjustable relative to each other.

A still further object of the invention is to provide a device or mechanism of this character having a snap action.

Another object of the invention is to provide a device or mechanism of this character utilizing the fluid pressure forces available for producing such snap action.

Still another object of the invention is to provide a device or mechanism of this character having a minimum number of parts.

A further object of the invention is to provide a device or mechanism of this character that may be easily and quickly serviced, the device being so constructed as to be easily and quickly taken apart and reassembled.

A still further object of the invention is to provide a device or mechanism of this character that is simple in construction and relatively inexpensive to manufacture.

Another object of the invention is to provide a device or mechanism of this character that is effective and reliable in operation.

Other objects and advantages of the invention will be brought out in the following part of the specification.

Referring to the drawings, which are for illustrative purposes only:

Fig. 1 is a diagrammatic view of a fluid compressor system embodying governor means constructed in accordance with the invention; and Fig. 2 is a sectional view of said governor means or device.

Referring to Fig. 1, there is shown a compressor, indicated generally at 10, having a cylinder 11 and a double acting piston 12 reciprocable in said cylinder 11. Air is drawn into the respective end portions of the cylinder 11 through inlet ports 13 and 14 respectively, said ports being controlled by check valves 15 and 16 which permit air to enter the respective ends of the cylinder but prevent air from being exhausted through the ports 13 and 14. While a double acting compressor is shown, it is to be understood that the compressor may have two cylinders, for example, with pistons therein, such compressors being well known.

Air is adapted to be discharged from the respective ends of the cylinder 11 through conduits 18 and 19 which are connected to a conduit 20 leading to a storage tank or reservoir 22. Air is prevented from flowing from the tank into the cylinder 11 by means of check valves 24 and 25 in the conduits 18 and 19. In order to unload the compressor when the storage tank 22 is charged to the maximum pressure desired, means is provided for pumping of air back and forth between the respective end portions of the cylinder 11, said means comprising a pneumatically actuated valve 27 comprising a cylinder 28 in which is reciprocably mounted a piston 29 having an annular groove 30 intermediate the ends thereof and a head 31. The cylinder 28 is connected with the respective conduits 18 and 19 by conduits 33 and 34. Communication between the conduits 33 and 34 is cut off when the piston 29 is disposed in the cylinder as shown in Fig. 1, said piston being urged to said position by a spring 36.

Means for controlling the valve 27 comprises a governor, indicated generally at 38, said governor being connected with the tank by means of a conduit 39 and being connected with the valve 27 by means of a conduit 40 which communicates with a pressure chamber 41 in the cylinder 28 above the piston head 31. The tank 22 is connected with a device or with devices to be actuated by means of a conduit 43.

When the valve 27 is in the position shown in Fig. 1 and the compressor piston is actuated, air is pumped into the reservoir or tank 22. When the tank pressure reaches a predetermined maximum, determined by the setting of the governor 38, the valve member 29 is forced downwardly, as shown in Fig. 1, so that there is communication between the conduits 33 and 34 by way of the groove 30 in said piston 29. The check valves 24 and 25 are so calibrated that the air will be moved back and forth between the respective end portions of the cylinder 11 as long as the piston 29 is in the downward position above mentioned. As air is used from the tank 22, the pressure therein drops and when said pressure has dropped to a predetermined minimum, the governor 38 will so function as to relieve the pressure in the chamber 41 of the cylinder 28, and spring 36 will move the valve 29 to the position shown in Fig. 1 whereat communication between the conduits 33 and 34 is cut off and the compressor will then pump air into the tank 22.

Referring to Fig. 2, the valve 38 comprises a base 50 having a laterally extending flange 51 whereby the governor may be attached to any suitable fixed support 52a. The base 50 has a body portion 52 and an upstanding tubular flange 53 having external threads 54, said flange 53 defining a cylindrical chamber 55 which is open at the free end. From the bottom 56 of said chamber 55, a bore 57 extends part way through the body 52 of the base. The bore 57 is axially aligned with the chamber 55 and there is a recess 58 extending a limited distance from the opposite side of the bore 52 and in axial alignment with the bore 57, there being a partition 59 between the bore 57 and the recess 58 forming the bottoms respectively of said bore and said recess. The partition 59 is provided with a threaded opening 60 therethrough for threaded reception of a screw 61 which has a portion extending upwardly, as shown in Fig. 2, of the bore 57. The opposite end of the screw 61 has a portion extending into the recess 58 and a plug 63 is provided for said recess. The plug 63 is provided with a threaded bore 64 which threadably receives the outer end of the screw 61 and serves as a locking element to hold the screw 61 in adjusted positions. A notch 65 is provided in the outer end of the plug 63 for reception of a screw driver or other suitable tool whereby the plug 63 is screwed into the recess or unscrewed therefrom. The plug 63 is provided with a reduced diameter portion 66 for reception of a sealing ring 67, said seal 67 being shown as an O ring.

The body 52 of the base 50 is provided with a laterally extending bore 69 which communicates with the lower end of the bore 57 to thereby provide a passage which is threaded adjacent its outer end as at 70 for reception of a fixture 71 whereby one end of conduit 40 is secured to the valve mechanism 38. The body 52 is provided with a second laterally extending bore 73 having its outer end threaded as at 74 for reception of fixture 75 whereby one end of the conduit 39 is secured to said valve mechanism 38. A passage 76 connects the bore 73 with the chamber 55 so as to provide communication therebetween. A generally cup-shaped cap 80 is provided and has internal threads 81 adjacent the open end for threadable connection with the flange 53. The interior of the cap 80 is connected with external atmosphere by means of an exhaust passage 82 and the bottom wall 83 has an axial, threaded bore 84 for reception of set screws 85 and 86. The set screw 85 has an inner end portion which extends into the interior of the cap 80 and engages one end of a fixed valve member 87, the other end of said valve member being engaged by the screw 61. The set screw 86 is provided as a locking means for holding the set screw 85 in adjusted positions.

Valve member 87 is provided with an annular groove 90 intermediate the ends thereof, said groove having sealing means therein, said sealing means being shown as an O ring 91. Below the groove 90, as shown in Fig. 2, is an annular groove 92 of less depth than the groove 90 and a valve member 87 is provided with a relieving portion 93 which extends from the groove 92 to the lower end of said valve member and provides means for the flow of fluid along the lower portion of said valve member.

Within the chamber 55 and interior of the cap 80 is a movable valve member, indicated generally at 95, which comprises a body 96 having an extension 97 at the lower end thereof, there being a bore 98 which extends axially through the body 96 and extension 97. The fixed valve member 87 is slidably received in the bore 98 of the movable valve member 95 and said valve member 95 has an outwardly extending flange 99 adjacent the lower end of the body 96, said flange 99 being slidably associated with the cylindrical wall of the chamber 55, there being an annular recess 100 in the periphery of the flange 99 in which is received a seal, shown as an O ring 101, to provide a sliding but sealing connection between the flange 99 and the wall of the chamber 55.

The movable valve member 95 is urged toward the bottom 56 of the chamber 55 by a spring 103 which reacts between the bottom wall 83 of the cap 80 and the upper side, as shown in Fig. 2, of the flange 99. Means for limiting the spring urged movement of the valve 95 comprises an annular washer 104 disposed about the upper end of the extension 99, thereby providing a space 105 for air so that said air, which is under pressure, may be effective on an outer annular area of the under side of flange 99 when the movable valve member 95 is at its lower limit of movement.

When the valve member 95 is in its lower limit of movement, the upper end is adjacent the annular grooves in the fixed member 87, as best shown in Fig. 2. The upper end of the bore 98 is rounded at 106 so that the movable valve member 95 may move upwardly over the O ring 91 with the valve member 95 in the position shown in Fig. 2; cross bores 107 adjacent the upper end of the body 96 registering with the annular groove 92 in the fixed valve member.

The extension 97 of the movable valve member 95 is slidably received in the bore 57 and when the valve member 95 is in its lowermost position, the lower end of extension 97 is spaced from the bottom of said bore 57. Cross bores 110 in the extension 97 provide communicating ports from the exterior to the interior of said extension. Adjacent the upper end of the bore 57 is an annular recess 111 for reception of sealing means, shown as an O ring 112 which provides a seal between the body 52 and the extension 97. The O ring 112 permits slidable movement of the extension 97 and also serves as a valve, as will be more particularly pointed out hereinafter. It is to be noted that the O ring 91 also serves as a valve part.

*Operation*

Assuming that the pressure in the reservoir or tank 22 is of such low value as to call for air from the compressor 10, the valve member 29 of the valve 27 will be positioned as shown in Fig. 1 so that the air pumped by reciprocation of the piston 12 will be pumped into the tank or reservoir 22. Under these conditions the pressure from the tank will be transmitted through the fluid pressure pipe 39 to the inlet opening 73 and connection 76 so that said pressure will be exerted in the space 105 of chamber 55 and will be exerted against the under side of the flange 99 of the movable valve member 95. As long as the pressure in tank 22 is below the predetermined maximum desired, the valve member 95 will float within the chamber 55 but will be in a position wherein the ports 107 will be above the seal 91 of the fixed valve member 87 and will be closed by the portion 87a of the valve member 87 above said seal. It will be noted that this portion 87a of the valve member 87 is completely cylindrical and when the ports 107 are above the seal 91, the latter will prevent any passage of air between the valve members 87 and 95 above said seal. Also under these conditions, the ports 110 of the extension 97 of said movable valve member 95 will be below the bottom 56 of the chamber 55.

The adjustment of the pressure of spring 103 determines the pressure value in the tank or reservoir 22 whereat the compressor will be cut out. As the pressure of the tank 22 is built up, such pressure is exerted on the under side of the flange 99 and against the force of spring 103 and when the tank pressure reaches the desired predetermined value, said pressure on the flange 99 will have overcome the force of spring 103 sufficiently to raise the valve member 95 to a point whereat the ports 110 of extension 97 will be above the effective sealing point of the seal 112 at the bottom of the chamber 55 so that pressure in the bottom of the chamber 55 beneath the valve member 55 will begin to be transmitted through the ports 110 into the bore 98 within the extension 97 and into the bore 57 and control opening 69 from which it is transmitted to the chamber 41 in the valve 27 by way of the control pipe 40. As soon as the pressure from the bottom portion 105 of the chamber 55 is transmitted into the bore 98 in extension 97 and into the bore 57, the area of the lower end of the walls of said extension 97 are subjected to the relatively high actuating presssure from the tank 22, thus adding this pressure area to the areas of the underside of flange 99 which is subjected to the tank pressure. The result is a sudden increase in the force urging the valve member 95 upwardly so that said valve member is quickly moved to a position whereat substantially the full area of the ports 110 are open to the pressure in the lower end 105 of chamber 55. In other words, there is a snap action of the valve member 95 at the critical point of action for transmitting tank pressure through the valve 38 to the chamber 41 in cylinder 28 of valve 27. The result is a downward movement of the piston 29 against the force of spring 36 so as to cause air to be pumped back and forth between the end portions of the cylinder 11 so that no more air will be pumped to the tank 22. As air is used from the tank 22, the fluid pressure on the underside of flange 99 of valve member 95 decreases and the spring 103 will force said valve member downwardly in accordance with such decrease in tank pressure. As the valve member 95 moves downwardly, the ports 110 are cut off from communication with the pressure in the lower part 105 of chamber 55. When the tank pressure reaches a predetermined minimum value, the valve member 95 will have been moved downwardly by spring 103 to a point where the ports 107 communicate with the groove 92 thereby permitting the exhaust of air from the chamber 41 of valve 27 through control pipe 40, opening 69, bore 57, bore 98 and passage 93. As soon as the ports 107 communicate with groove 92, the pressure on the lower end of the wall of extension 97 is relieved thereby permitting the spring 103 to quickly move the valve member 95 to its lowermost position. The air exhausted through the ports 107 into the interior of the cap 80 is exhausted to atmosphere through the outlet or exhaust opening 82. As soon as the ports 107 communicate with the groove 92 so as to vent the control pressure to atmosphere, the valve member 95 moves downwardly with a snap action.

As soon as the pressure in chamber 41 is relieved, the valve member 29 is moved to the position shown in Fig. 1 where it cuts off the flow between the end portions of the cylinder 11 so that air pumped by the compressor 10 flows into the tank or reservoir 22.

It is to be noted that the exhaust ports 107 are closed, by upward movement of valve member 95 before the control pressure ports or control ports 110 are open and that, upon reverse movement of the valve member 95, the ports 110 are closed before the exhaust ports 107 are open.

As has been already stated, the compressor cut in and cut out points are independently adjustable in the present device. By adjusting the position of the fixed valve member 87, the cut in point is adjusted and by adjusting the spring 103, the cut out point is adjusted. The adjustment of spring 103 is varied by screwing the cap 80 downwardly or upwardly, as shown in Fig. 2, so as to vary the spring loading of the movable valve member 95.

I claim:

1. In a valve device: a body having a fluid pressure inlet and a control pressure opening; a movable valve member having an axial bore therethrough and movable between two positions; a fixed valve member received in said bore; spring means, said movable valve member being subjected to opposing pressure of said spring means and the fluid pressure of said inlet, said movable valve member being slidable on the fixed valve member, said valve members having an exhaust passage and port means and control port means arranged so that when the movable valve member is in one of said positions said control port connects said inlet with said control pressure opening so that inlet pressure is transmitted through said control port means to the control opening, and when said movable valve member is in the other of said positions, said control port means are out of connecting position so as to cut off the connection between said inlet and said control opening, the exhaust port means of the valve members then being open to relieve the pressure in said control pressure opening through said exhaust passage and port means.

2. In a valve device: a body having a chamber therein with an axial bore extending from the bottom of said chamber, said body having an inlet opening communicating with said chamber and a control opening communicating with said bore; a cap connected with said body, said cap being hollow and having an opening from the interior to the exterior thereof; a fixed valve member axially supported in said chamber, said fixed valve member having an annular exhaust groove therein intermediate the ends thereof and a second annular groove adjacent the outer end of the exhaust groove; a seal in said second groove; a movable valve member including an axial extension at one end, said valve member having an axial bore extending therethrough for reception of the fixed valve member so that said movable valve member is slidable on said fixed valve member, said movable valve member having an exhaust port adjacent the end opposite the extension and having a control port in said extension, said extension being slidable in the bore from said chamber, one of said valve members having a passage therein connecting the exhaust groove with the interior of the extension; means forming a seal between the body and the extension of said movable valve member, said seal being adjacent the bottom of said chamber; and spring means within the cap and chamber exerting yielding force on said movable valve member.

3. The invention defined by claim 2 where the seals comprise O rings forming valve parts cooperable with the movable valve member.

4. The invention defined by claim 2 wherein the fixed valve member is longitudinally adjustable.

5. The invention defined by claim 4 wherein said cap is adjustable on the body for varying the force of the spring means on said movable valve member.

6. In a valve device: a body having a chamber therein with an axial bore extending from the bottom of said chamber, said body having an inlet opening communicating with said chamber and a control opening communicating with said bore; a cap connected with said body, said cap being hollow and having an opening from the interior to the exterior thereof; a fixed valve member axially supported in said chamber, said fixed valve member having an annular exhaust groove therein intermediate the ends thereof and a second annular groove adjacent the outer end of the exhaust groove; a seal in said second groove; a movable valve member including an axial extension at one end, said valve member having an axial bore extending therethrough for reception of the fixed valve member so that said movable valve member is slidable on said fixed valve member, the end of the bore in said movable valve member adjacent said seal being smoothly flared outwardly, said movable valve member having an exhaust port adjacent the end opposite the extension and having a control port in said extension, said extension being slidable in the bore from said chamber, one of said valve members having a passage therein connecting the exhaust groove with the interior of the extension; means forming a seal between the body and the extension of said movable valve member, said seal being adjacent the bottom of said chamber; and yielding means within the cap for exerting yielding force on said movable valve member.

7. In a valve device: a body having a chamber therein with an axial bore extending from the bottom of said chamber, said body having an inlet opening communicating with said chamber and a control opening communicating with said bore; a cap connected with said body, said cap being hollow and having an opening from the interior to the exterior thereof; a fixed valve member axially supported in said chamber, said fixed valve member having an annular exhaust groove therein intermediate the ends thereof; a movable valve member including an axial extension at one end, said valve member having an axial bore extending therethrough for reception of the fixed valve member so that said movable valve member is slidable on said fixed valve member, said movable valve member having an exhaust port adjacent the end opposite the extension and having a control port in said extension, said extension being slidable in the bore from said chamber, one of said valve members having a passage therein connecting the exhaust groove with the interior of the extension; and yielding means exerting yielding force on said movable valve member in a direction opposing inlet pressure on said movable valve member.

8. In a valve device: a body having a chamber therein with an axial bore extending from the bottom of said chamber, said body having an inlet opening communicating with said chamber and a control opening communicating with said bore; a cap connected with said body, said cap being hollow and having an opening from the interior to the exterior thereof; a central valve member in said chamber, said central valve member having an annular exhaust groove therein intermediate the ends thereof; a screw engaging each end of said central member and holding same in fixed position; a movable valve member including an axial extension at one end, said valve member having an axial bore extending therethrough for reception of the central valve member so that said movable valve member is slidable on said central valve member, said movable valve member having an exhaust port adjacent the end opposite the extension and having a control port in said extension, said extension being slidable in the bore from said chamber, one of said valve members having a passage therein connecting the exhaust groove with the interior of the extension; and yielding means exerting yielding force on said movable valve member urging said valve member toward the inlet end of said chamber.

9. In a valve device: a body having a chamber therein with an axial bore extending from the bottom of said chamber, said body having an inlet opening communicating with said chamber and a control opening communicating with said bore; a fixed valve member axially arranged in said chamber, said fixed valve member having an exhaust groove therein; a movable valve member including an axial extension at one end provided with a control port, said valve member having an axial bore extending therethrough for reception of the fixed valve member so that said movable valve member is slidable on said fixed valve member, said movable valve member having an exhaust port, said extension being slidable in the bore from said chamber, one of said valve members having a passage therein connecting the exhaust groove with the interior of the extension; and yielding means exerting yielding force on said movable valve member urging said valve member toward the inlet end of said chamber.

10. In a valve device: a body having a chamber therein with an axial bore extending from the bottom of said chamber, said body having an inlet opening communicating with said chamber and a control opening communicating with said bore; a fixed valve member axially arranged in said chamber, said fixed valve member having an exhaust groove therein; a movable valve member including an axial extension at one end slidable in said axial bore, said extension having a control port therein, said movable valve member having an axial bore extending therethrough for slidable reception of the fixed valve member, said movable valve member also having an exhaust port, one of said valve members having a passage therein connecting the exhaust groove with the interior of the extension; and yielding means exerting yielding force on said movable valve member against inlet pressure in said chamber.

11. In a valve device: a body having a chamber therein, said body having an inlet opening communicating with said chamber and a control opening; a fixed valve member axially supported in said chamber, said fixed valve member having an exhaust groove therein intermediate the ends thereof; a movable valve member having an axial bore extending therethrough for slidable reception of the fixed valve member, the lower end of the latter being spaced upwardly of the lower end portion of said bore, said movable valve member having an exhaust port adjacent one end and having a control port adjacent the opposite end, said exhaust and control ports communicating with said bore, one of said valve members having a passage therein connecting the exhaust groove with the bore of said movable valve member below the fixed valve member and said control ports being adapted to communicate with the inlet end of said chamber when the movable valve member is in a predetermined position; and yielding means exerting yielding force on said movable valve member against inlet pressure in said chamber.

References Cited in the file of this patent

UNITED STATES PATENTS

| 1,293,178 | Osborne | Feb. 4, 1919 |
| 1,965,070 | Cumming | July 3, 1934 |
| 2,252,418 | Shelley | Aug. 12, 1941 |
| 2,372,942 | Fischer et al. | Apr. 3, 1945 |

FOREIGN PATENTS

| 139,633 | Austria | Nov. 26, 1934 |